(12) United States Patent
Akune et al.

(10) Patent No.: US 6,310,313 B1
(45) Date of Patent: Oct. 30, 2001

(54) ELECTRICAL DISCHARGE APPARATUS

(75) Inventors: Mitsuaki Akune; Hajime Ogawa; Takashi Kanaya, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/592,576

(22) Filed: Jun. 12, 2000

Related U.S. Application Data

(63) Continuation of application No. PCT/JP98/03321, filed on Jul. 24, 1998.

(30) Foreign Application Priority Data

Dec. 11, 1997 (JP) .................................................... 9-341047

(51) Int. Cl.⁷ ............................. B23H 1/00; B23H 7/20; B23H 7/30
(52) U.S. Cl. ................... 219/69.2; 219/69.11; 219/69.16
(58) Field of Search ............................... 219/69.2, 69.16, 219/69.11

(56) References Cited

U.S. PATENT DOCUMENTS 5,900,165 * 5/1999 Taneda ............................... 219/69.16

FOREIGN PATENT DOCUMENTS

| 62-282827 | * 12/1987 | (JP) . |
| 63-251122 | 10/1988 | (JP) . |
| 1-178394 | 7/1989 | (JP) . |
| 2-143140 U | 12/1990 | (JP) . |
| 8-57714 | 3/1996 | (JP) . |

OTHER PUBLICATIONS

International Search Report.

* cited by examiner

*Primary Examiner*—Geoffrey S. Evans
(74) *Attorney, Agent, or Firm*—Sughrue, Mion, Zinn, Macpeak & Seas, PLLC

(57) ABSTRACT

Separately from an electrode jumping operation (an amount of rise of a first electrode jump (22)) aimed at discharging machining debris produced during electrical discharge machining, an electrode jumping operation (an amount of rise of a second electrode jump (23)) is inserted for which is set an amount of rise of jump with which balls or rollers used on a sliding portion of a mechanically driving part undergo one revolution or more. Further, in a case where an abnormality of a lubricant supplying unit (101) is detected, as for a program being continued, machining is stopped after the termination of the program, or machining is stopped after continuing the program within a fixed time duration, or a program other than for machining operation is made executable.

7 Claims, 12 Drawing Sheets

MANNER IN WHICH THE LUBRICANT IS APPLIED
TO THE BALLS INSIDE THE BALL SCREW NUT
BY THE ROTATION OF THE BALLS

FIG.6
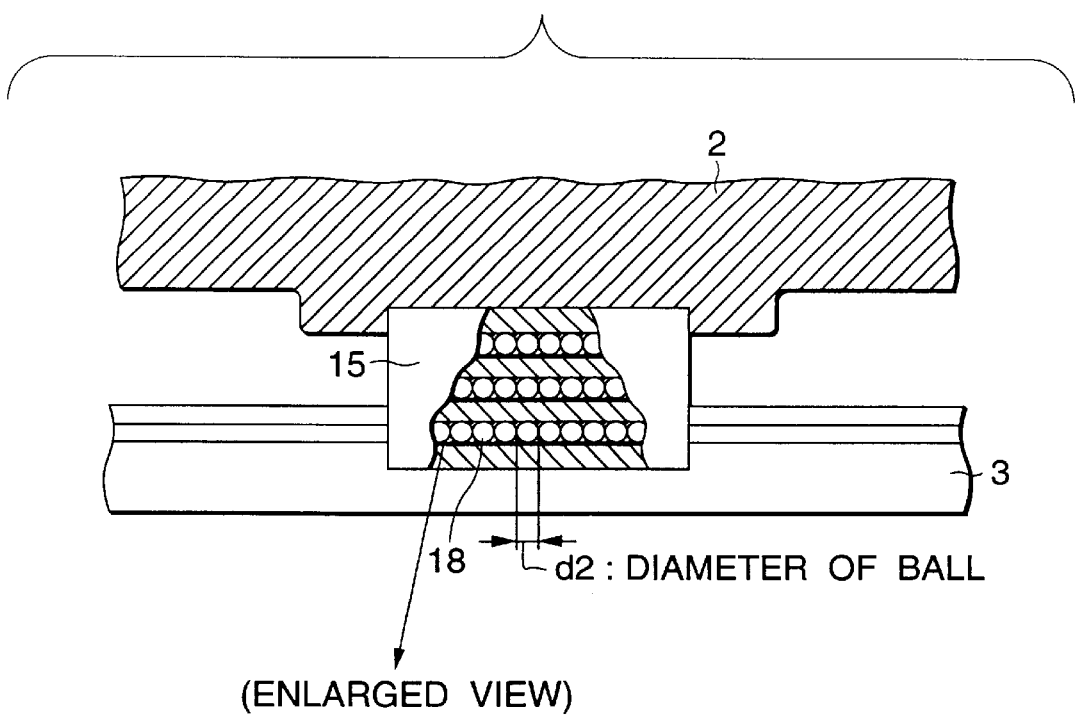
(ENLARGED VIEW)
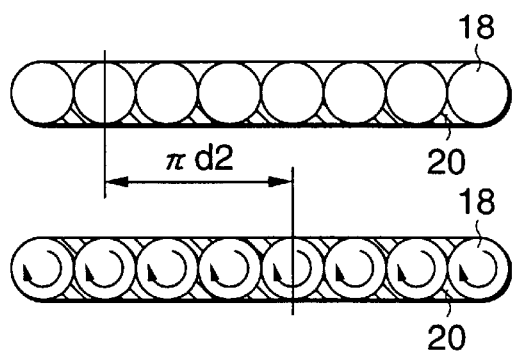
MANNER IN WHICH THE LUBRICANT IS APPLIED
TO THE BALLS INSIDE THE GUIDE BLOCK
BY THE ROTATION OF THE BALLS

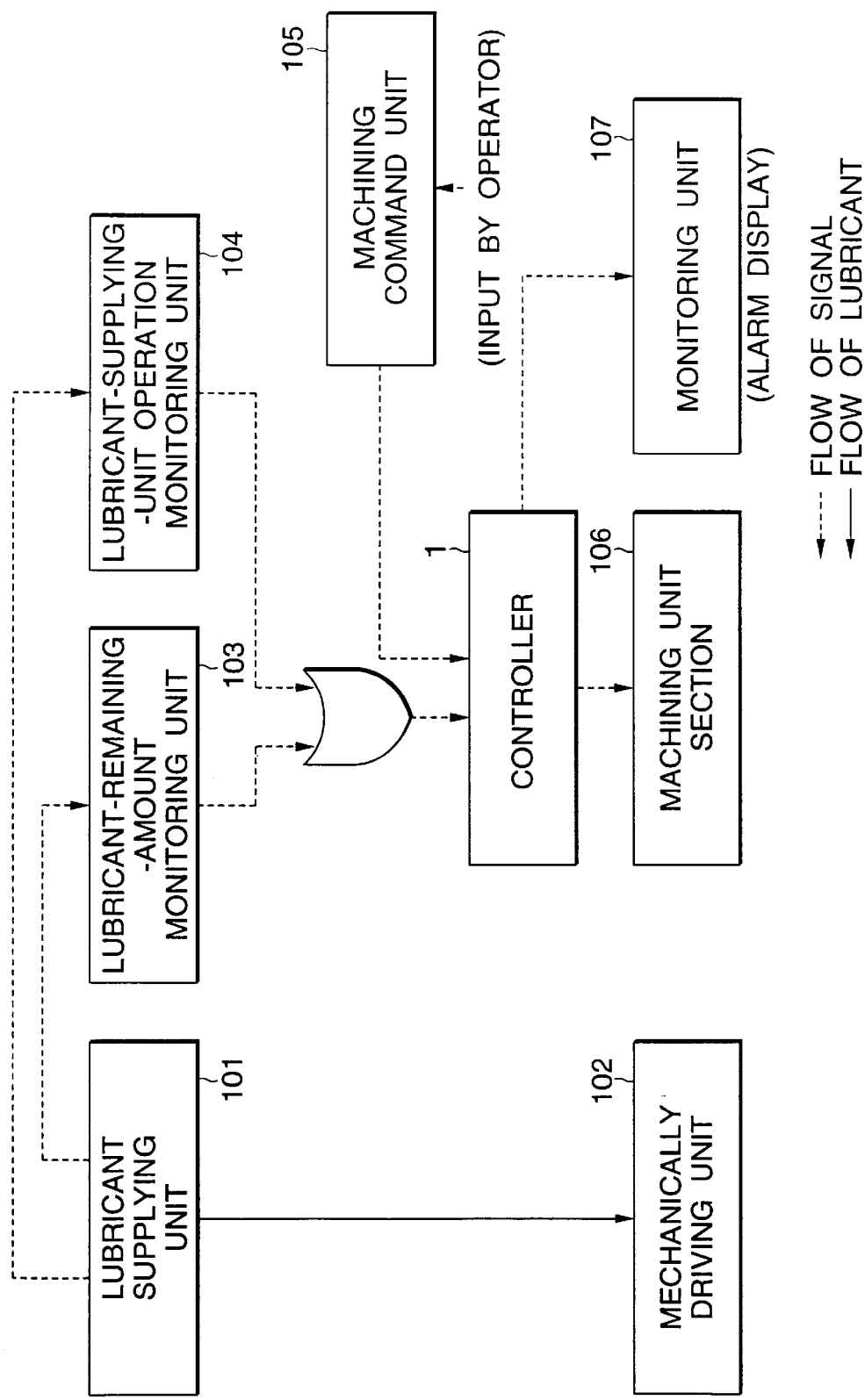

ELECTRICAL DISCHARGE APPARATUS

This application is a continuation of PCT/JP98/03321 filed Jul. 24, 1998.

BACKGROUND OF THE INVENTION

1. Field of the Invention

The present invention relates to improvements in an electrical discharge apparatus, and more particularly to improvements in an electrical discharge apparatus capable of maintaining for long periods of time the effect of lubricating balls or rollers used in sliding portions of mechanically driven parts, and improvements in an electrical discharge apparatus capable of preventing a decline in the operating efficiency due to a condition such as a machining stop during an abnormality of a lubricant supplying unit for supplying a lubricant to the mechanically driven parts.

2. Description of the Related Art

In an electrical discharge apparatus for machining a workpiece by supplying working electric power to a gap between the workpiece and an electrode provided in a working fluid, it is well-known that unless machining debris produced in the machining gap is eliminated by some method, the insulation between the electrode and workpiece and the repetition of electric discharge cannot be maintained in proper states, and that a state of arc discharge occurs, producing adverse effects such as a decline in the machining efficiency and the deterioration of characteristics of the machined surface.

As a technique used in conjunction with the injection, ejection, and suction of a working fluid to discharge the machining debris from the machining gap, the so-called electrode jumping operation is known in which the electrode is intermittently made to undergo reciprocating motion at a high speed. In the case of a machining configuration for which fluid processing, such as the injection, ejection, and suction of the working fluid to discharge the machining debris, cannot be physically used, the electrode jumping operation is the only method of discharging the machining debris and is generally regarded as one of the machining conditions.

An example of this electrode jumping operation is shown in FIG. 12, in which the ordinate shows the position of the electrode, while the abscissa shows the time. Parameters of the electrode jumping operation include an amount of rise of jump, 201, jump time 202, machining time 203, and a jump speed. For example, in a case where the machining depth is large, by securing a sufficiently large amount of rise of the jump, the discharge of the machining debris from the deep machined hole is made possible. Further, the jump speed affects the jump time (wasteful time) which does not contribute to machining as well as the machining-debris discharging efficiency. Thus, the setting of the parameters of the electrode jumping operation is very important to improve the machining rate by discharging the machining debris with high efficiency.

In addition, to improve the machining efficiency, it is the general practice to repeat the electrode jumping operation at a high speed and a high acceleration. For example, the conditions of the electrode jumping operation in which the amount of rise of the jump is 0.2 mm and the maximum rate of arrival reaches 1,000 to 5,000 mm/min are set values which are commonly used frequently, and the speed and the acceleration are very large. Under such conditions of the electrode jumping operation, the load applied to mechanically driving parts, such as a ball screw and guides, which are generally used in the electrical discharge apparatus is very large, and it is difficult to form and maintain oil films of a lubricant on their sliding surfaces.

Further, in the electrical discharge apparatus in which positional changes during machining are very small and machining is carried out for long periods of time as compared with general machine tools, the wear of sliding surfaces of the mechanically driving parts is sometimes accelerated locally. If the wear of the sliding surfaces continues to be accelerated locally, a decline in the machining accuracy, in particular, constitutes a problem in the electrical discharge apparatus for which working accuracy on the order of microns is required. Therefore, to avoid the occurrence of such wear, it is extremely important to supply the lubricant constantly or intermittently to the mechanically driving parts such as the ball screw and the guides.

If the lubricant fails to be supplied to the mechanically driven parts due to the shortage of the lubricant or a failure of a lubricator, an advance in the wear of the mechanically driven parts is acceleratedly promoted, and the dust of wear produced continues to bite into the sliding surfaces, with the result being that the mechanically driven parts are subjected to further damage.

Furthermore, with the electrical discharge apparatus, since the time of performing unmanned operation is long, and high-accuracy machining is required, it is necessary to provide some protective function or other in preparation for such a situation in which the supply of the lubricant is stopped. Accordingly, a protective function is provided for forcibly terminating a machining program in progress in the event that the supply of the lubricant is stopped during the operation of the electrical discharge apparatus. However, if such a protective function is operated, since the time of performing unmanned operation is long in the electrical discharge apparatus as described above, the decline in the operating efficiency due to the stoppage of the scheduled machining in its course has presented a large problem.

SUMMARY OF THE INVENTION

The present invention has been devised to overcome the above-described problems, and its primary object is to obtain an electrical discharge apparatus capable of maintaining for long periods of time the effect of lubricating balls or rollers used in sliding portions of mechanically driving parts during the electrode jumping operation.

In addition, a secondary object is to obtain an electrical discharge apparatus which has the function of monitoring the state of operation of a lubricant supplying unit for supplying a lubricant to the mechanically driving parts, and which is capable of preventing a decline in the operating efficiency due to the stoppage of scheduled machining in its course upon detection of an abnormality in the remaining amount of the lubricant in the lubricant supplying unit or an abnormality of the lubricant supplying unit.

To attain these objects, the electrical discharge apparatus in accordance with the invention comprises: first electrode jumping means whereby the electrode is caused to jump with respect to the workpiece and in which an amount of rise of jump (an amount of rise of a first electrode jump) is set as one machining condition aimed at discharging machining debris produced during electric discharge; second electrode jumping means whereby the electrode is caused to jump with respect to the workpiece and in which is set an amount of rise of jump (an amount of rise of a second electrode jump) with which balls or rollers used on a sliding portion of a mechanically driving part of the electrical discharge apparatus undergo one revolution or more; and a unit for determining the jumping operation for making a comparison between the amount of rise of the first electrode jump and the amount of rise of the second electrode jump, wherein in a case where the amount of rise of the first electrode jump is smaller than the amount of rise of the second electrode jump, the second electrode jumping operation is effected in addition to the first electrode jumping operation.

In addition, the electrical discharge apparatus comprises: a lubricant supplying unit for supplying a lubricant to a mechanically driving part; a lubricant-remaining-amount monitoring unit having a function of detecting an abnormality in a remaining amount of the lubricant supplying unit or a remaining amount therein and outputting the same to a controller; and a lubricant-supplying-unit operation monitoring unit having a function of detecting an abnormality of the lubricant supplying unit and outputting the same to the controller, wherein machining is stopped after a program being executed is terminated in at least any one of a first case in which the abnormality has been detected by the lubricant-remaining-amount monitoring unit, a second case in which the remaining amount of the lubricant detected by the lubricant-remaining-amount monitoring unit is at a prescribed value or below, and a third case in which the abnormality has been detected by the lubricant-supplying-unit operation monitoring unit.

Further, the electrical discharge apparatus comprises: the lubricant supplying unit; the lubricant-remaining-amount monitoring unit; and the lubricant-supplying-unit operation monitoring unit, wherein machining is stopped after a program being executed is continued within a fixed time duration in at least any one of the first case in which the abnormality has been detected by the lubricant-remaining-amount monitoring unit, the second case in which the remaining amount of the lubricant detected by the lubricant-remaining-amount monitoring unit is at the prescribed value or below, and the third case in which the abnormality has been detected by the lubricant-supplying-unit operation monitoring unit.

Furthermore, the electrical discharge apparatus comprises: the lubricant supplying unit; the lubricant-remaining-amount monitoring unit; and the lubricant supplying-unit operation monitoring unit, wherein a program other than for machining operation is made executable in at least any one of the first case in which the abnormality has been detected by the lubricant-remaining-amount monitoring unit, the second case in which the remaining amount of the lubricant detected by the lubricant-remaining-amount monitoring unit is at the prescribed value or below, and the third case in which the abnormality has been detected by the lubricant-supplying-unit operation monitoring unit.

BRIEF DESCRIPTION OF THE DRAWINGS

FIG. 6 is a partial cross-sectional view illustrating the details of a sliding portion of a guide and a guide block in accordance with the second embodiment of the invention;

Figure 7A:
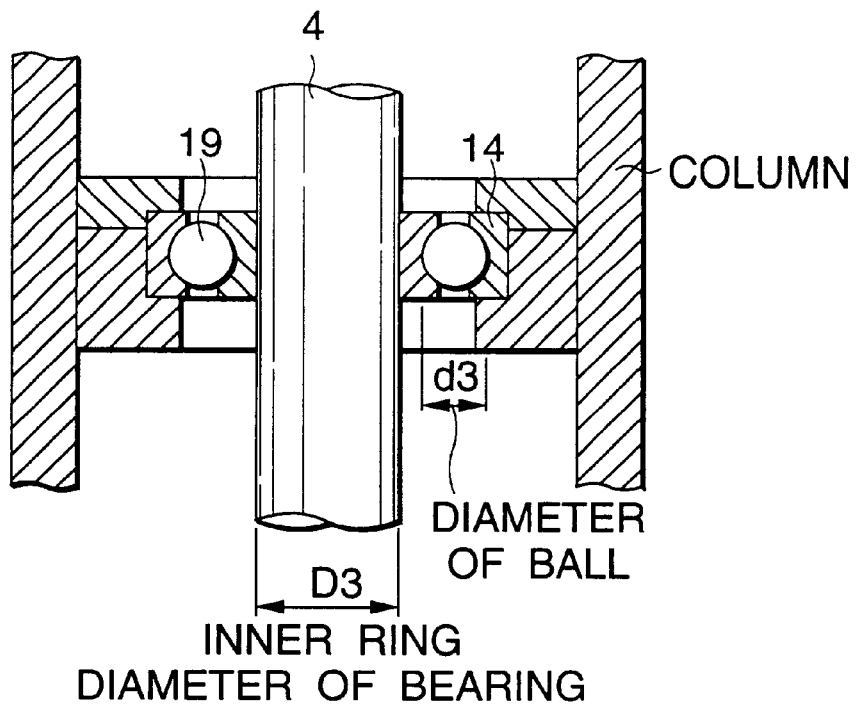
Figure 7B:
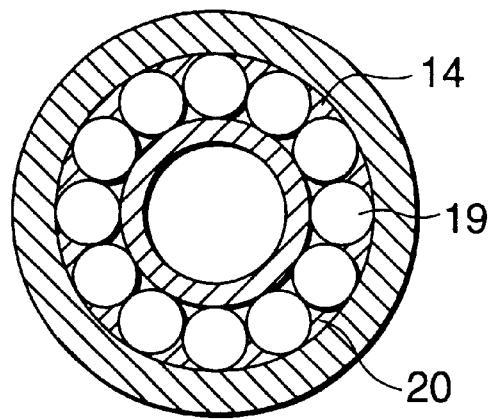
Figure 9:
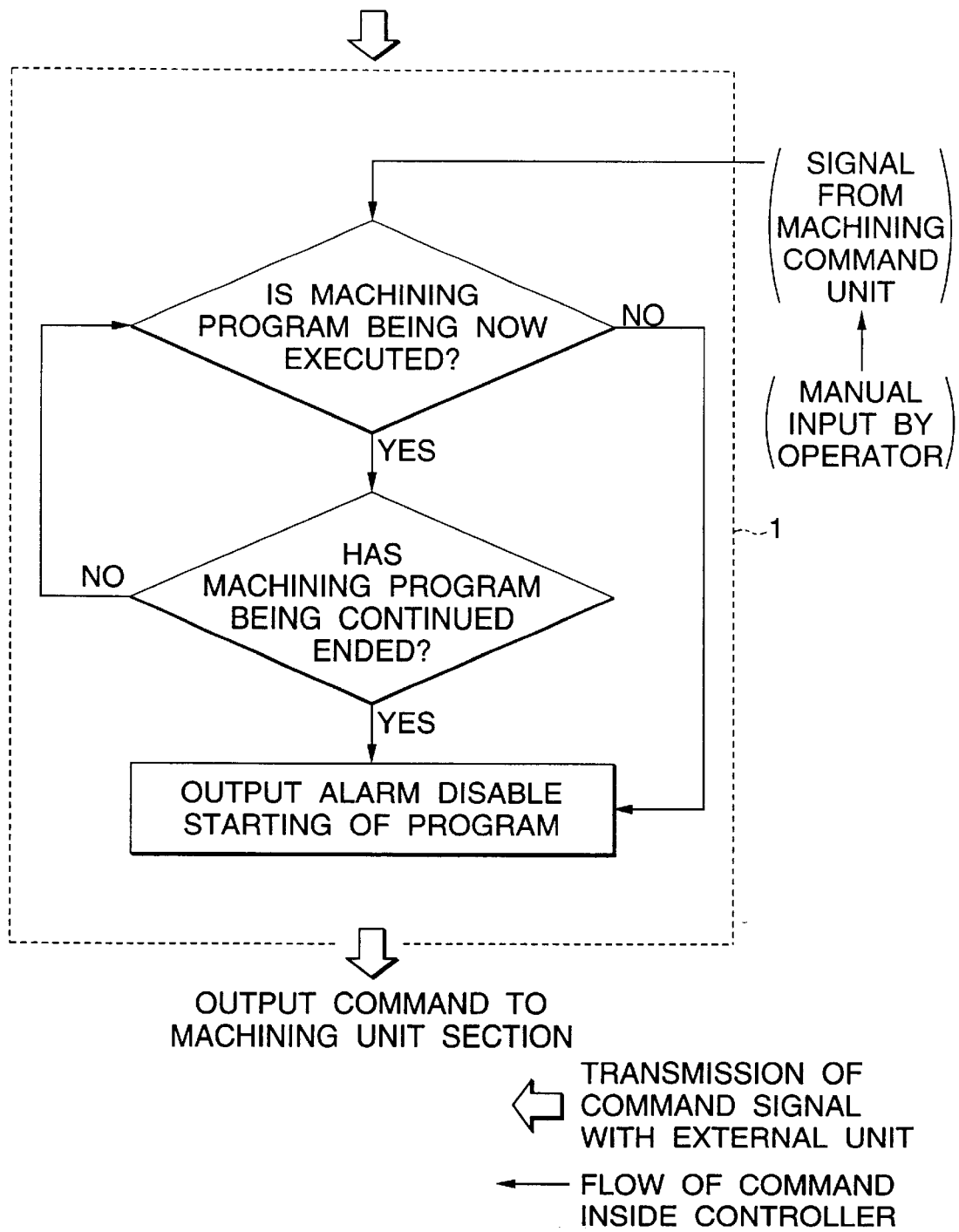
Figure 10:
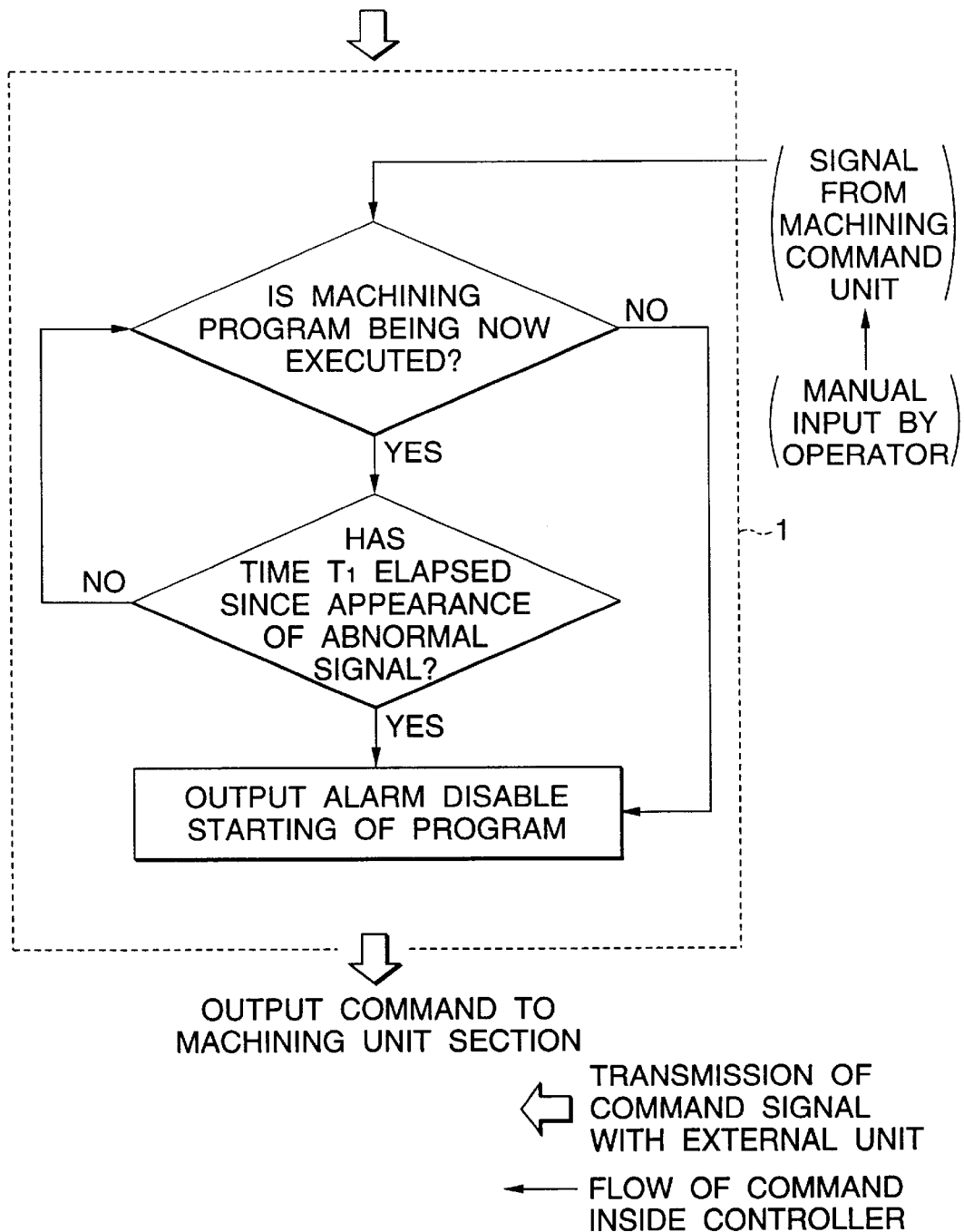
Figure 11:
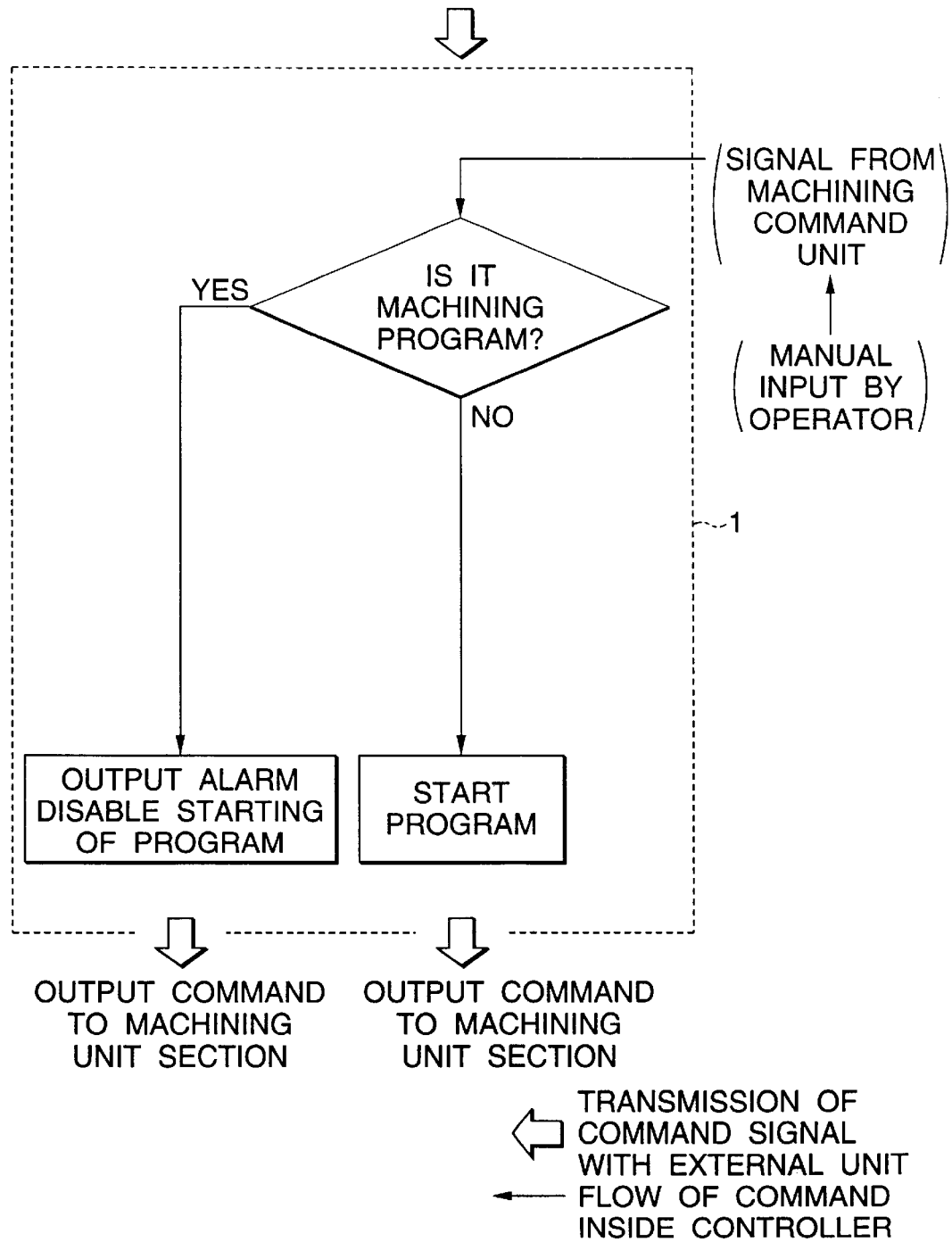
Figure 12:
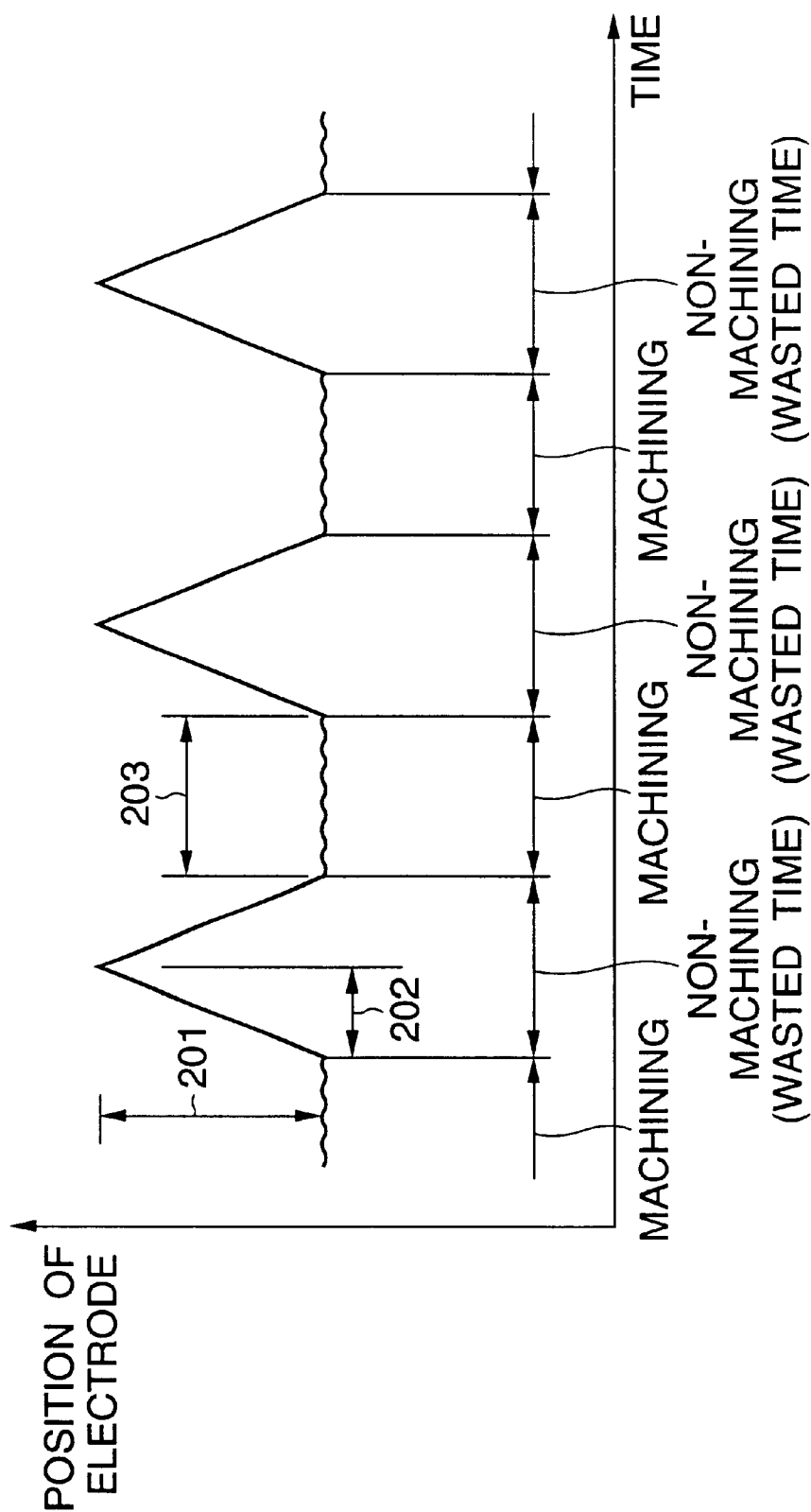

Each of FIGS. 7A and 7B is a cross-sectional view illustrating the details of that portion of a ball screw which is supported on a column by means of a bearing in accordance with the third embodiment of the invention;

FIG. 8 is a connection diagram illustrating a mechanism for detecting an abnormality signal concerning a lubricant supplying unit and a path for processing signals in accordance with fourth to sixth embodiments of the invention;

FIG. 9 is a flowchart illustrating a processing procedure at a time when an abnormality signal concerning the lubricant supplying unit has been detected in accordance with the fourth embodiment of the invention;

FIG. 10 is a flowchart illustrating a processing procedure at a time when an abnormality signal concerning the lubricant supplying unit has been detected in accordance with the fifth embodiment of the invention;

FIG. 11 is a flow chart illustrating a processing procedure at a time when an abnormality signal concerning the lubricant supplying unit has been detected in accordance with the sixth embodiment of the invention; and FIG. 12 is a diagram illustrating the electrode jumping operation which is performed during conventional machining.

DETAILED DESCRIPTION OF THE PRESENT INVENTION (First Embodiment)

Figure 1:
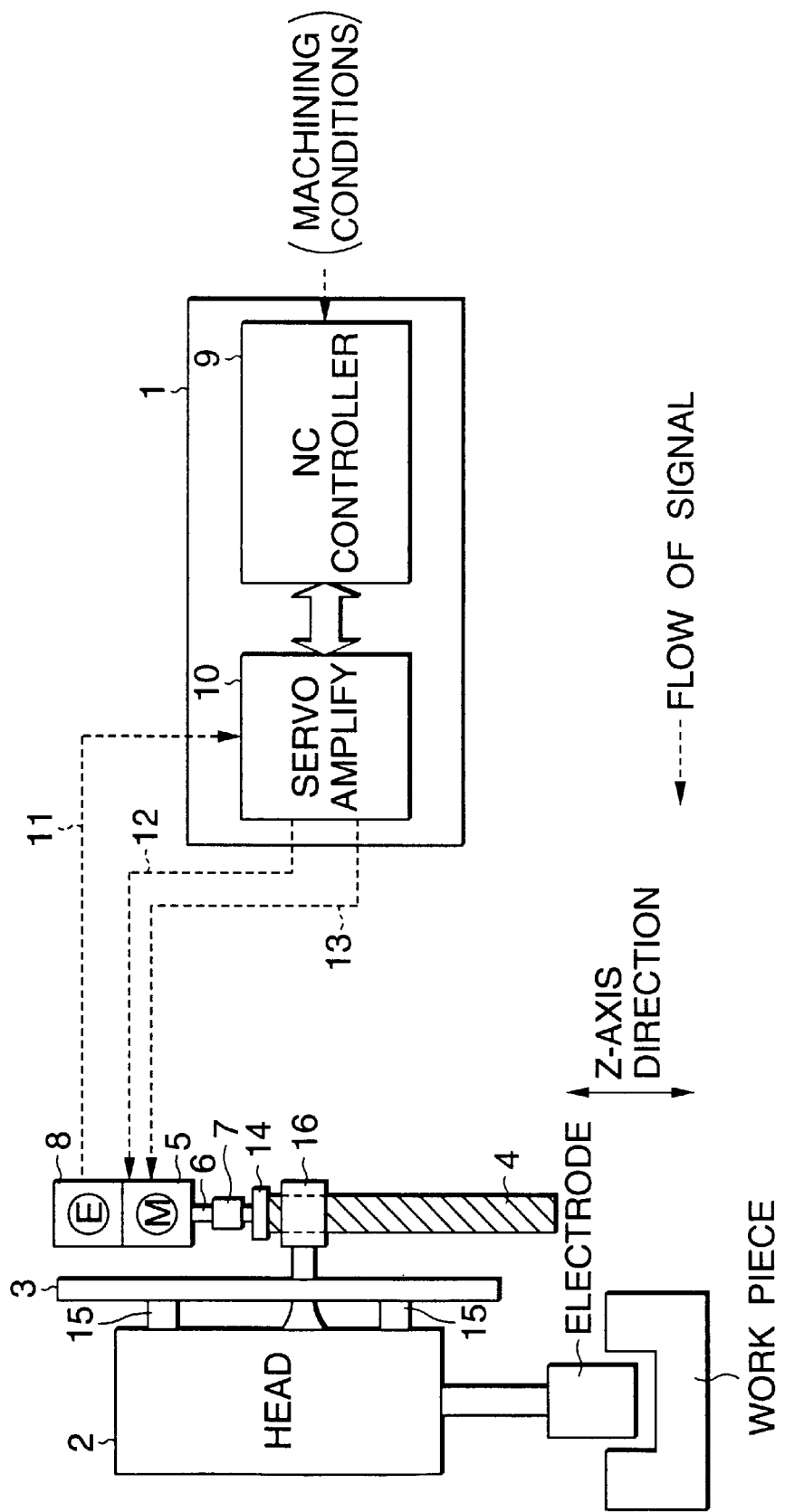
FIG. 1 is a block diagram for executing a second electrode jumping operation in accordance with first to third embodiments of the invention.

FIG. 1 illustrates an electrical discharge apparatus in accordance with a first embodiment of the invention. Although, in practice, machining is possible in the respective directions of X, Y, and Z axes, a description will be given by citing as an example processing in the direction of the Z axis. In the drawing, a head 2 is supported by a guide 3 for effecting linear motion, a motor shaft 6 of a servo motor 5 is coupled to a ball screw 4 through a coupling 7, and a ball screw nut 16 is fixed to the head 2 side. Accordingly, the ball screw 4 is rotated by an output of the servo motor 5 driven by a control unit 1, and the head 2 together with the ball screw nut 16 moves in a vertical direction (in the Z-axis direction). A movement commanding signal 12 for machining is outputted from an NC controller 9, is amplified by a servo amplifier 10, and is sent to the servo motor 5 to perform predetermined movement. Further, an encoder 8 detects a present position, and feeds back its position detection signal 11 to the servo amplifier 10.

In addition, working electric power is supplied to a gap between a workpiece and an electrode, which is fixed to the head 2 disposed in a working fluid, by means of an unillustrated machining power supply, and the machining of the workpiece progresses as the electric discharge occurs.

Figure 2:
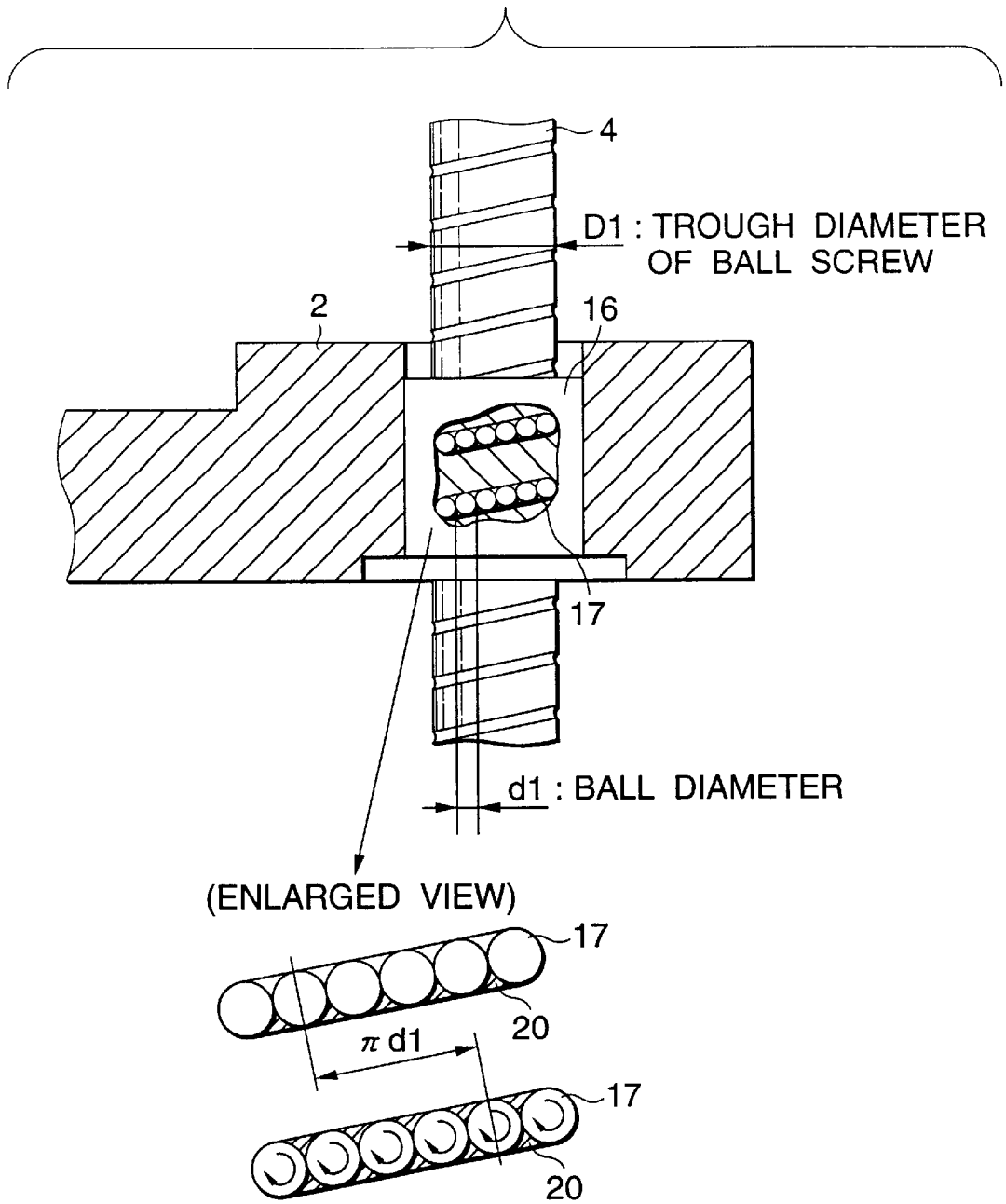
FIG. 2 is a partial cross-sectional view illustrating the details of a sliding portion of a ball screw nut in accordance with the first embodiment of the invention.

FIG. 2 is a partial cross-sectional view illustrating the details of a sliding portion of the ball screw nut 16. Numeral 17 denotes balls inside the ball screw nut, and 20 denotes a lubricant. When the balls 17 inside the ball screw nut rotate by one revolution or more, the lubricant 20 is applied to the entire peripheries of the balls 17.

Figure 3:
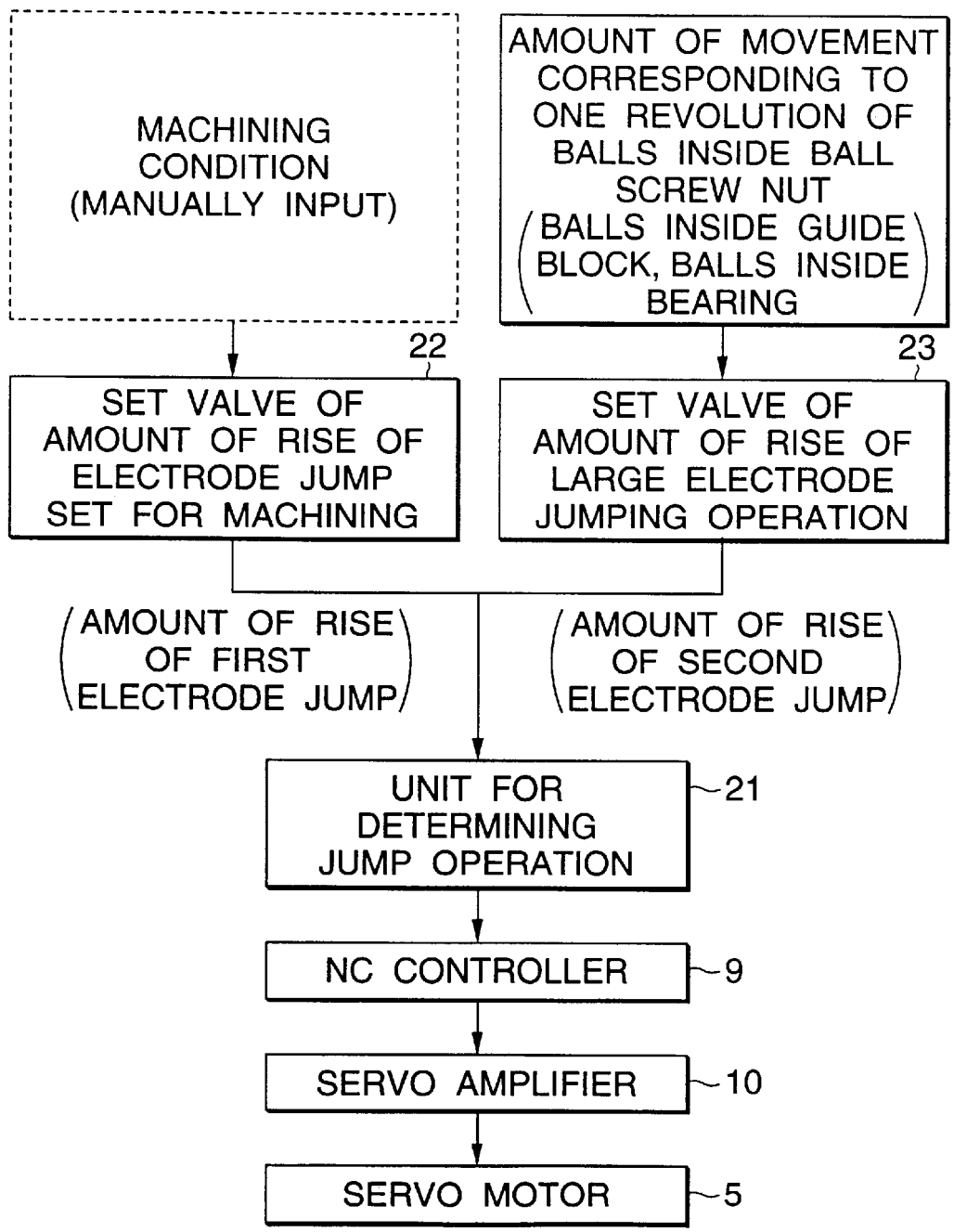
FIG. 3 is a flowchart of signals in a controller for executing the second electrode jumping operation in accordance with the first to third embodiments of the invention.

FIG. 3 shows a determination procedure for determining the execution of a large electrode jumping operation (a second electrode jumping operation) in accordance with the first embodiment. After a set value 22 of an amount of rise of the electrode jump (an amount of rise of a first electrode jump) which is set for machining is inputted, if a unit 21 for determining the jumping operation determines that it is impossible to rotate the balls 17 inside the ball screw nut by one revolution or more, a command is sent to the NC controller 9 to insert during machining a set value 23 of an amount of rise of the electrode jumping operation (an amount of rise of thee second electrode jump) which is large in a fixed period. If it is assumed that the trough diameter of the ball screw 4 is D1, the diameter of the ball 17 is d1, and the lead of the ball screw 4 is L, then an amount of rise of jump, J1, with which the balls 17 undergo one revolution can be imparted by $J1 @ L \times d1/D1$. Accordingly, to determine whether or not the balls can be rotated by one revolution or more, it suffices if a comparison is made between the amount of rise of jump, J1, and the amount of rise of the first electrode jump, 22. In addition, as for the aforementioned amount of rise of the second electrode jump, it suffices if the amount of rise is of such a measure that the balls 17 inside the ball screw nut are rotated by, for example, two revolutions (e.g., $J1 \times 2$).

In FIG. 1, a second movement commanding signal 13 for the electrode jump is outputted from the NC controller 9 to the servo motor 5 through the servo amplifier 10 by using a separate system from that of the movement commanding signal 12 for machining.

When this signal is inputted thereto, the servo motor 5 drives the head 2 so as to perform the second electrode jumping operation for each period by means of the ball screw 4 and the ball screw nut 16. The encoder 8 detects the present position, and the position detection signal 11 is fed back to the NC controller through the servo amplifier 10, so that it is possible to consecutively check the state of the second electrode jump.

Figure 4:
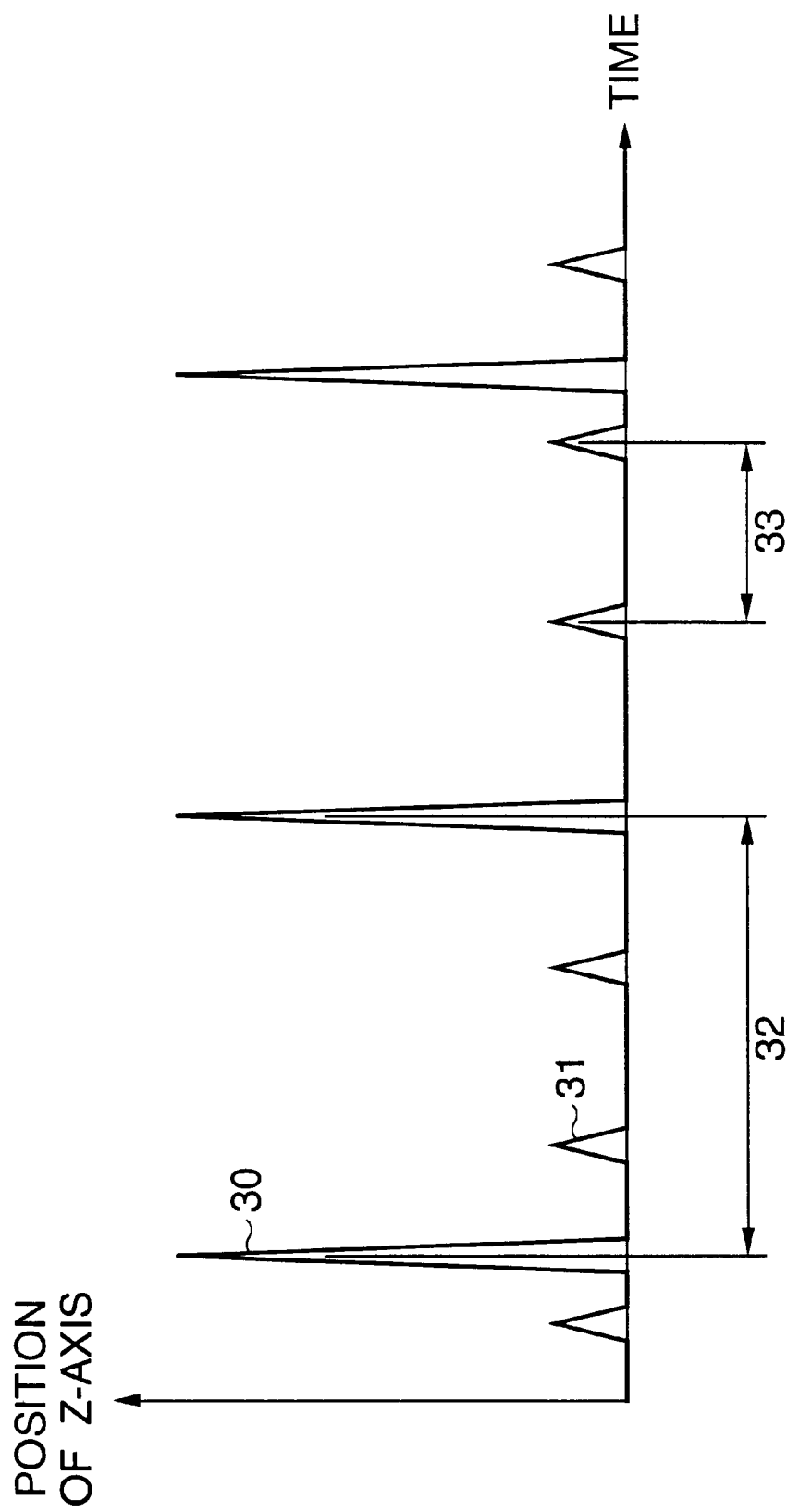
FIG. 4 is an operational diagram illustrating the locus of operation of a Z axis in a case where the second electrode jumping operation in accordance with the first to third embodiments of the invention has been executed.

FIG. 4 shows the locus of operation of the Z axis in a case where the second electrode jump command has been inputted, and the ordinate indicates the position of the Z axis and the abscissa indicates the time. Reference numeral 30 denotes the locus of the second electrode jumping operation, and numeral 31 denotes the locus of the first electrode jumping operation. Further, numeral 32 denotes the period of the second electrode jumping operation, while 33 denotes the period of the first electrode jumping operation. These two jumping operations can be respectively effected In separate periods irrespective of the synchronization or asynchronization of the timing generated. As the second electrode jumping operation is inserted, even in a high-speed, small-rise-amount jumping region where the lubricating performance of mechanically driving portions is particularly liable to deteriorate, their lubricating capability can be sufficiently maintained.

Furthermore, if the second electrode jumping operation is executed at a faster speed and with a greater amount of rise, it is possible to further enhance the effect of thoroughly spreading over the sliding surfaces the lubricant applied to the outer peripheral surfaces of the balls inside the ball screw nut which is a component part of the ball screw. This is due to the phenomenon in which the faster the movement between sliding surfaces, the greater the thickness of the oil film. The lubricating performance of the mechanical driving parts can be further improved by this effect.

Figure 5:
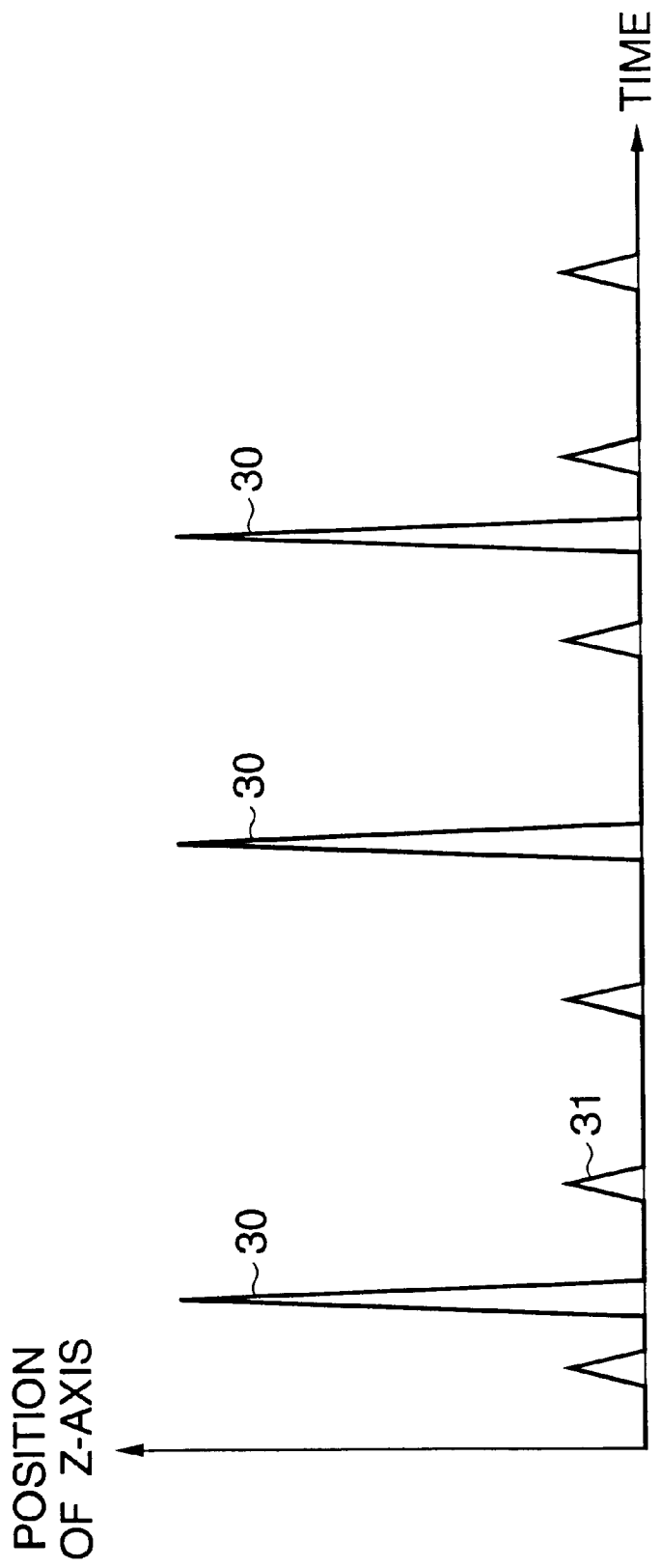
FIG. 5 is an operational diagram illustrating the locus of operation of a Z axis in a case where the second electrode jumping operation in accordance with the first to third embodiments of the invention has been executed non periodically.

Although in the foregoing example a case has been shown in which the second electrode jumping operation is inserted periodically, a similar advantage can be obtained if the second electrode jumping operation is inserted non periodically, as shown in FIG. 5.

(Second Embodiment)

FIG. 1 also shows an electrical discharge apparatus in accordance with a second embodiment of the invention, in the drawing, the guide 3 is fixed to a column (not shown), and supports guide blocks 15 fixed to the head 2 in such a manner as to be movable only in a vertical direction (in the Z-axis direction).

FIG. 6 is a partially sectional view illustrating the details of sliding portions of the guide 3 and the guide block 15, and reference numeral 18 denotes balls inside the guide block, while numeral 20 denotes the lubricant. If the balls 18 inside the guide block undergo one revolution or more, the lubricant 20 is applied to the entire peripheries of the balls.

FIG. 3 also shows a determination procedure for determining the execution of the second electrode jumping operation in accordance with the second embodiment. After the amount of rise of the first electrode jump, 22, is inputted, if the unit 21 for determining the jumping operation determines that this amount of rise of the jump cannot cause the balls 18 inside the guide block to undergo one revolution or more, the determining unit 21 instructs the NC controller to insert the second electrode jumping operation during the machining. If it is assumed that the diameter of the ball 18 inside the guide block is d2, then an amount of rise of jump, J2, with which the balls 18 undergo one revolution in this case can be imparted by $J2 = \pi \times d2$ ($\pi$ is the ratio of the circumference to its diameter). Accordingly, to determine whether or not the balls can be rotated by one revolution or more, it suffices if a comparison is made between the amount of rise of jump, J2, and the amount of rise of the first electrode jump, 22. In addition, as for the other operation, the description is the same as that for the first embodiment.

In this case as well, it is possible to obtain an advantage similar to that of the first embodiment in the lubrication of the balls 18 inside the guide blocks used as mechanically driving portions. In addition, a similar advantage can be obtained in a case where rollers are used instead of the balls inside the guide blocks.

(Third Embodiment)

FIG. 1 also shows an electrical discharge apparatus in accordance with a third embodiment of the invention. The ball screw 4 is supported on the column (not shown) by means of a bearing 14.

Each of FIGS. 7A and 7B is a cross-sectional view of that portion of the ball screw 4 which is supported on the column by means of the bearing 14. Reference numeral 19 denotes a ball inside the bearing, and numeral 20 denotes the lubricant. In the same way as in the first and second embodiments, if the balls 19 inside the bearing undergo one revolution or more, the lubricant 20 is applied to the entire peripheries of the balls.

FIG. 3 also shows a determination procedure for determining the execution of the second electrode jumping operation in accordance with the third embodiment. After the amount of rise of the first electrode jump, 22, is inputted, if the unit 21 for determining the jumping operation determines that this amount of rise of the jump cannot cause the balls 19 inside the bearing 14 supporting the ball screw 4 to undergo one revolution or more, the determining unit 21 instructs the NC controller to insert the second electrode jumping operation during the machining. If it is assumed that the inner ring diameter of the bearing 14 is D3, the diameter of the ball 19 inside the bearing is d3, and the lead of the ball screw 4 is L, then an amount of rise of jump, J3, with which the balls 19 undergo one revolution in this case can be imparted by $J3 \cong L \times d3/D3$. Accordingly, to determine whether or not the balls can be rotated by one revolution or more, it suffices if a comparison is made between the amount of rise of jump, J3, and the amount of rise of the first electrode jump, 22. In addition, as for the other operation, the description is the same as that for the first embodiment.

In this case as well, it is possible to obtain an advantage similar to that of the first embodiment in the lubrication of the balls 19 inside the bearing 14 supporting the ball screw and used as mechanically driving portions. In addition, a similar advantage can be obtained in a case where rollers are used instead of the balls inside the bearing.

(Fourth Embodiment)

FIG. 8 shows an electrical discharge apparatus in accordance with a fourth embodiment of the invention. In the drawing, an arrangement provided is such that a lubricant supplying unit 101 supplies the lubricant to mechanically driving parts 102, and a lubricant-remaining-amount monitoring unit 103 for monitoring the remaining amount of the lubricant in the lubricant supplying unit 101 and a lubricant-supplying-unit operation monitoring unit 104 for monitoring the state of operation of the lubricant supplying unit 101 transmit signals to the controller 1 while constantly monitoring the lubricant supplying unit 101. The lubricant-remaining-amount monitoring unit 103 transmits an abnormality signal to the controller 1 in a case where the remaining amount of the lubricant in the lubricant supplying unit 101 is at a prescribed value or below. Further, the lubricant-supplying-unit operation monitoring unit 104 transmits an abnormality signal to the controller 1 in a case where an abnormality such as the operation stop has occurred.

In a case where an abnormality has been detected by the lubricant-remaining-amount monitoring unit 103 or the lubricant-supplying-unit operation monitoring unit 104, the controller 1 immediately outputs an instruction for an alarm display to a monitoring unit 107. In the controller 1, the contents of machining command signals that are sent from a machining command unit 105 are computed, and a command signal concerning the subsequent continuation of the program is outputted to a machining unit section 106 which actually performs machining.

FIG. 9 shows the procedure of determination by the controller 1 in a case where an abnormality has been detected by the lubricant-remaining-amount monitoring unit 103 or the lubricant-supplying-unit operation monitoring unit 104 in the fourth embodiment of the invention. The program being executed is continued as it is until its end, but the starting of a new program is inhibited after the end.

(Fifth Embodiment)

FIG. 8 also shows a basic configuration of an electrical discharge apparatus in accordance with a fifth embodiment of the invention. FIG. 10 shows the procedure of determination by the controller 1 in a case where an abnormality has been detected by the lubricant-remaining-amount monitoring unit 103 or the lubricant-supplying-unit operation monitoring unit 104 in the fifth embodiment of the invention. The program being executed is continued for a certain time duration t1 upon detection of the abnormality, by if the program does not end within this time duration, the program is forcibly terminated, and the starting of a new program is subsequently inhibited.

(Sixth Embodiment)

FIG. 8 also shows a basic configuration of an electrical discharge apparatus in accordance with a sixth embodiment of the invention. FIG. 11 shows the procedure of determination by the controller 1 in a case where an abnormality has been detected by the lubricant-remaining-amount monitoring unit 103 or the lubricant-supplying-unit operation monitoring unit 104 in the sixth embodiment of the invention. If a command for starting the machining program is inputted from the machining command unit, an alarm is issued to inhibit the execution, but in the case of a program which does not involve machining, such as setup program, the starting of the program is selectively possible.

It should be noted that although, in the fourth to sixth embodiments, a case has been shown in which the lubricant remaining amount monitoring unit 103 monitors whether or not the remaining amount of the lubricant in the lubricant supplying unit 101 is at a prescribed value or below, and transmits an abnormality signal to the controller I if the remaining amount is at the prescribed value or below, the signal representing the remaining amount in the lubricant supplying unit 101 may be transmitted directly to the controller 1, and the determination may be made by the controller 1 as to whether or not the remaining amount of the lubricant is at the prescribed value or below.

Since the invention is configured as described above, the invention offers the following advantages.

As described above, the electrical discharge apparatus comprises: first electrode jumping means whereby the electrode is caused to jump with respect to the workpiece and in which an amount of rise of jump (an amount of rise of a first electrode jump) is set as one machining condition aimed at discharging machining debris produced during electric discharge; second electrode jumping means whereby the electrode is caused to jump with respect to the workpiece and in which is set an amount of rise of jump (an amount of rise of a second electrode jump) with which balls or rollers used on a sliding portion of a mechanically driving part of the electrical discharge apparatus undergo one revolution or more; and a unit for determining the jumping operation for making a comparison between the amount of rise of the first electrode jump and the amount of rise of the second electrode jump, wherein in a case where the amount of rise of the first electrode jump is smaller than the amount of rise of the second electrode jump, the second electrode jumping operation is effected in addition to the first electrode jumping operation. Accordingly, it is possible to obtain an electrical discharge apparatus capable of maintaining the effect of lubricating the aforementioned balls or rollers for long periods of time.

In addition, the electrical discharge apparatus comprises: a lubricant supplying unit for supplying a lubricant to a mechanically driving part; a lubricant-remaining-amount monitoring unit having a function of detecting an abnormality in a remaining amount of the lubricant supplying unit or a remaining amount therein and outputting the same to a controller; and a lubricant-supplying-unit operation monitoring unit having a function of detecting an abnormality of the lubricant supplying unit and outputting the same to the controller, wherein machining is stopped after a program being executed is terminated in at least any one of a first case in which the abnormality has been detected by the lubricant-remaining-amount monitoring unit, a second case in which the remaining amount of the lubricant detected by the lubricant-remaining-amount monitoring unit is at a prescribed value or below, and a third case in which the abnormality has been detected by the lubricant-supplying-unit operation monitoring unit. Accordingly, it is possible to obtain an electrical discharge apparatus capable of preventing a decline in the operating efficiency since scheduled machining can be continued for a fixed time duration.

Further, the electrical discharge apparatus comprises: the lubricant supplying unit; the lubricant-remaining-amount monitoring unit; and the lubricant-supplying-unit operation monitoring unit, wherein machining is stopped after a program being executed is continued within a fixed time duration in at least any one of the first case in which the abnormality has been detected by the lubricant-remaining-amount monitoring unit, the second case in which the remaining amount of the lubricant detected by the lubricant-remaining-amount monitoring unit is at the prescribed value or below, and the third case in which the abnormality has been detected by the lubricant-supplying-unit operation monitoring unit. Accordingly, it is possible to obtain an electrical discharge apparatus capable of preventing a decline in the operating efficiency since scheduled machining can be continued for a fixed time duration.

Furthermore, the electrical discharge apparatus comprises: the lubricant supplying unit; the lubricant-remaining-amount monitoring unit; and the lubricant-supplying-unit operation monitoring unit, wherein a program other than for machining operation is made executable in at least any one of the first case in which the abnormality has been detected by the lubricant-remaining-amount monitoring unit, the second case in which the remaining amount of the lubricant detected by the lubricant-remaining-amount monitoring unit is at the prescribed value or below, and the third case in which the abnormality has been detected by the lubricant-supplying-unit operation monitoring unit. Accordingly, it is possible to obtain an electrical discharge apparatus capable of preventing a decline in the operating efficiency.

As described above, the electrical discharge apparatus in accordance with the invention is capable of maintaining for long periods of time the effect of lubricating balls or rollers used in sliding portions of mechanically driving parts, and of preventing a decline in the operating efficiency due to such as a machining stop during an abnormality of the lubricant supplying unit for supplying the lubricant to the mechanically driving parts.

Therefore, the electrical discharge apparatus in accordance with the invention is suitable for use in electrical discharge machining operations.

What is claimed:

1. An electrical discharge apparatus for machining a workpiece, the electrical discharge apparatus comprising:
    an electrode;
    means for supplying working electric power to a gap between the workpiece and the electrode provided in a working fluid;
    first electrode jumping means for causing said electrode to jump with respect to the workpiece, in which an amount of rise during a first electrode jump is set as one machining condition;
    second electrode jumping means for causing said electrode to jump with respect to the workpiece, in which an amount of rise during a second electrode jump is set such that balls or rollers used on a sliding portion of a mechanically driven part of said electrical discharge apparatus undergo one revolution or more; and
    a unit for making a comparison between the amount of rise during the first electrode jump and the amount of rise during the second electrode jump,
    wherein, when the amount of rise during the first electrode jump is smaller than the amount of rise during the second electrode jump, the second electrode jumping operation is effected in addition to the first electrode jumping operation.

2. The electrical discharge apparatus according to claim 1, wherein the amount of rise during the second electrode jump is set so that the balls on the sliding portion of a ball screw used as the mechanically driven part undergo one revolution or more.

3. The electrical discharge apparatus according to claim 1, wherein the amount of rise during the second electrode jump is set so that the balls or the rollers on the sliding portion of a guide used as the mechanically driven part undergo one revolution or more.

4. The electrical discharge apparatus according to claim 1, wherein the amount of rise during the second electrode jump is set so that the balls or the rollers on the sliding portion of a bearing used as the mechanically driven part undergo one revolution or more.

5. An electrical discharge apparatus for machining a workpiece, the electrical discharge apparatus comprising:
    an electrode;
    means for supplying working electric power to a gap between the workpiece and the electrode provided in a working fluid;
    a lubricant supplying unit for supplying a lubricant to a mechanically driven part;
    a lubricant-remaining-amount monitoring unit having a function of detecting an abnormality in a remaining amount of the lubricant in said lubricant supplying unit or the remaining amount of the lubricant therein, and outputting the same to a controller; and
    a lubricant-supplying-unit operation monitoring unit having a function of detecting an abnormality of said lubricant supplying unit, and outputting the same to said controller,
    wherein there is provided means for stopping machining after an executing program finishes executing, in at least any one of a first case in which the abnormality in the remaining amount of the lubricant in said lubricant supplying unit has been detected by said lubricant remaining-amount monitoring unit, a second case in which the remaining amount of the lubricant detected by said lubricant-remaining-amount monitoring unit is at a prescribed value or below, and a third case in which the abnormality of said lubricant supplying unit has been detected by said lubricant-supplying-unit operation monitoring unit.

6. An electrical discharge apparatus for machining a workpiece comprising:
    an electrode;
    means for supplying working electric power to a gap between the workpiece and the electrode provided in a working fluid;
    a lubricant supplying unit for supplying a lubricant to a mechanically driven part;
    a lubricant-remaining-amount monitoring unit having a function of detecting an abnormality in a remaining amount of the lubricant in said lubricant supplying unit or the remaining amount of the lubricant therein, and outputting the same to a controller; and
    a lubricant-supplying-unit operation monitoring unit having a function of detecting an abnormality of said lubricant supplying unit, and outputting the same to said controller,
    wherein there is provided means for stopping machining after an executing program continues executing within a fixed time duration, in at least any one of a first case in which the abnormality in the remaining amount of the lubricant in said supplying unit has been detected by said lubricant-remaining-amount monitoring unit, a second case in which the remaining amount of the lubricant detected by said lubricant-remaining-amount monitoring unit is set at a prescribed value or below, and a third case in which the abnormality of said lubricant supplying unit has been detected by said lubricant-supplying-unit operation monitoring unit.

7. An electrical discharge apparatus for machining a workpiece, the electrical discharge comprising:

an electrode;

means for supplying working electric power to a gap between the workpiece and the electrode provided in a working fluid;

a lubricant supplying unit for supplying a lubricant to a mechanically driven part;

a lubricant-remaining-amount monitoring unit having a function of detecting an abnormality in a remaining amount of the lubricant in said lubricant supplying unit or the remaining amount of the lubricant therein, and outputting the same to a controller; and a lubricant-supplying-unit operation monitoring unit having a function of detecting an abnormality of said lubricant supplying unit, and outputting the same to said controller, wherein there is provided means for allowing a program, other than one for performing a machining operation, to be executable, in at least any one of a first case in which the abnormality in the remaining amount of the lubricant in said lubricant supplying unit has been detected by said lubricant-remaining-amount monitoring unit, a second case in which the remaining amount of the lubricant detected by said lubricant-remaining-amount monitoring unit is at a prescribed value or below, and a third case in which the abnormality of said lubricant supplying unit has been detected by said lubricant-supplying-unit operation monitoring unit.

* * * * *